(No Model.)
J. D. MILLER & J. A. DOFFLEMYRE.
ELECTRIC DEVICE FOR SLAUGHTERING ANIMALS.
No. 431,777. Patented July 8, 1890.
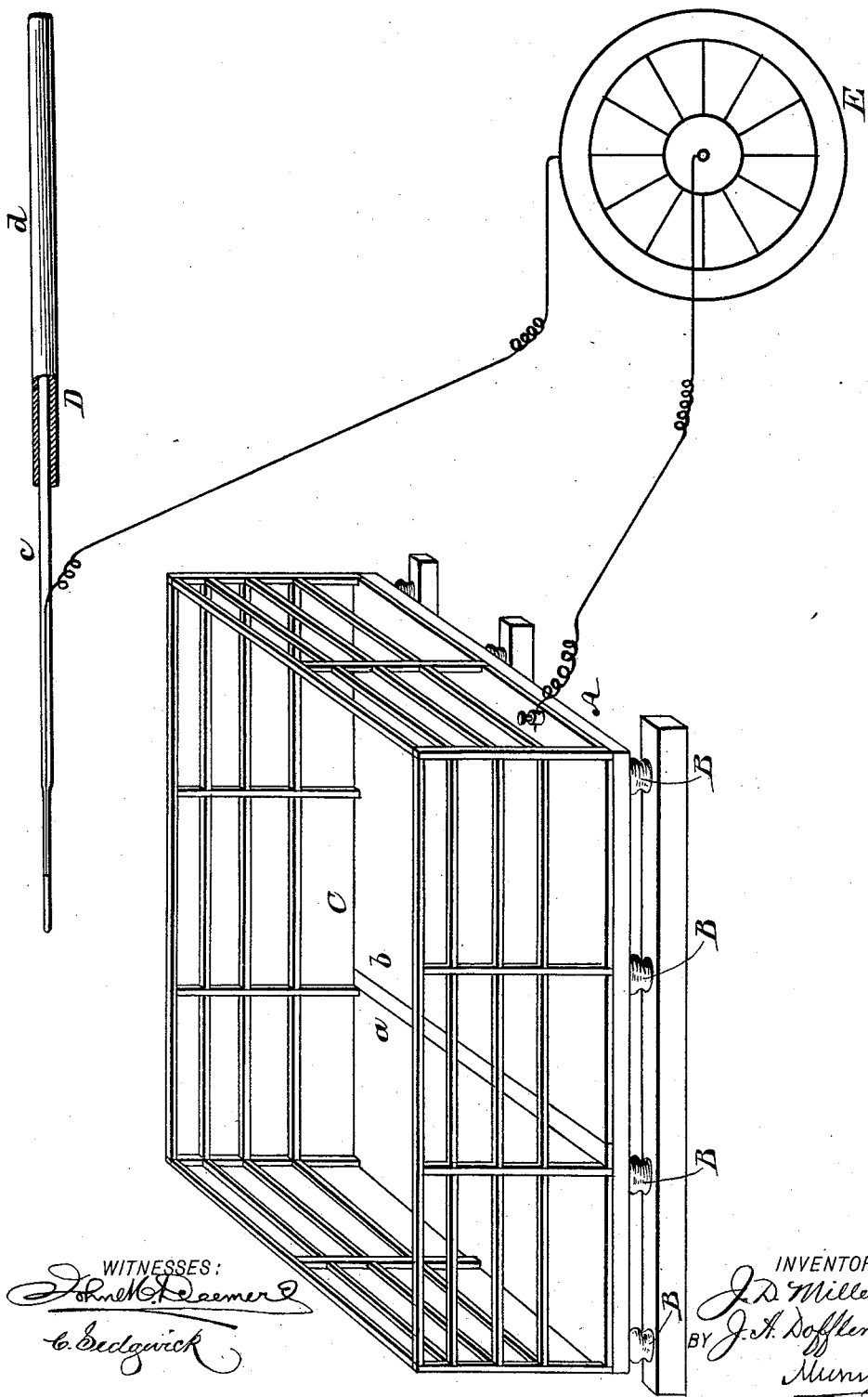

UNITED STATES PATENT OFFICE.

JACOB DAVID MILLER AND JAMES ALBERT DOFFLEMYRE, OF GUNNISON, COLORADO.

ELECTRIC DEVICE FOR SLAUGHTERING ANIMALS.

SPECIFICATION forming part of Letters Patent No. 431,777, dated July 8, 1890.

Application filed April 7, 1890. Serial No. 346,922. (No model.)

*To all whom it may concern:*

Be it known that we, JACOB DAVID MILLER and JAMES ALBERT DOFFLEMYRE, both of Gunnison, in the county of Gunnison and State of Colorado, have invented a new and Improved Electrical Device for Slaughtering Animals, of which the following is a specification, reference being had to the accompanying drawing, which is a perspective view, partly in section, of our improved device.

The object of our invention is to construct an effective device by which the slaughtering of animals may be accomplished by means of an electric current.

Our invention consists in the combination, with a suitable pen provided with a metallic floor divided into two sections, of an electric generator, and an electrode for applying the current to the animal, all as will be hereinafter more fully described.

The pen A rests upon insulators B, of glass or other suitable material, and is provided with a metallic floor C, preferably formed of copper and divided into two sections $a$ $b$, which are insulated from each other. The electrode D, to be manipulated by the person using the apparatus, consists of a metallic rod $c$, inserted in an insulating-handle $d$. The electrode D is connected with one pole of the dynamo E, the remaining pole of the dynamo being connected electrically with the metallic floor C. One of the sides of the pen is made removable, so that the animal may be readily driven in. The dynamo E is capable of generating a current of sufficiently high electro-motive force to instantly kill the animal placed within the pen.

In carrying out the operation of the apparatus the animal is first driven through a shallow pool of water to wet its hoofs, so as to form a good electrical contact with the sections $a$ $b$ of the metallic floor. When the animal stands partly upon each section $a$ $b$, it may be killed by bringing the electrode D into contact with the part $a$, thereby causing a current from the dynamo to flow through the electrode, through the part $a$ of the floor C, through the animal to the part $b$ of the metallic floor, thence back to the dynamo; or, if desired, the animal may be killed by the direct application of the electrode D to the head of the animal.

We have found by experiment that this method of killing is less cruel and barbarous than the usual method. The animal bleeds freer, and the meat is benefited by the passage through it of an electric current. It is also found that meat slaughtered by this process will keep in warm weather longer than that killed in any other way. It is also claimed that pork slaughtered by the electric method will be found entirely free from trichinæ. It also avoids injury to the animal common in the shackled method of slaughtering.

Having thus described our invention, we claim as new and desire to secure by Letters Patent—

1. In an apparatus for killing animals by electricity, the combination of a pen provided with a metallic floor, a dynamo for generating a suitable electric current, and an electrode for applying the current, substantially as specified.

2. In an apparatus for slaughtering animals, the combination of a pen supported on insulators and provided with a metallic floor made in two sections, a dynamo for generating a suitable electric current, and an electrode provided with an insulating-handle, substantially as specified.

JACOB DAVID MILLER.
JAMES ALBERT DOFFLEMYRE.

Witnesses:
ALFRED G. CLARK,
WILLIAM J. FINE.